(12) United States Patent
Calkins et al.

(10) Patent No.: US 8,755,993 B2
(45) Date of Patent: Jun. 17, 2014

(54) ENERGY CONSUMPTION PROFILING

(75) Inventors: Andrew Calkins, Naperville, IL (US); Eric N. Groth, Buffalo Grove, IL (US)

(73) Assignee: Navteq B.V., Veldhoven (NL)

( * ) Notice: Subject to any disclaimer, the term of this patent is extended or adjusted under 35 U.S.C. 154(b) by 514 days.

(21) Appl. No.: 13/042,617

(22) Filed: Mar. 8, 2011

(65) Prior Publication Data
US 2012/0232783 A1  Sep. 13, 2012

(51) Int. Cl.
G01C 21/34 (2006.01)

(52) U.S. Cl.
USPC .......... 701/123; 701/410; 701/424; 701/439; 340/995.19

(58) Field of Classification Search
USPC ............. 701/123, 410, 424, 439; 340/995.19, 340/995.22
See application file for complete search history.

(56) References Cited

U.S. PATENT DOCUMENTS

| | | | | |
|---|---|---|---|---|
| 5,742,922 A * | 4/1998 | Kim | ................. | 701/423 |
| 5,913,917 A * | 6/1999 | Murphy | ................. | 701/123 |
| 6,005,494 A * | 12/1999 | Schramm | ................. | 340/995.19 |
| 7,369,938 B2 * | 5/2008 | Scholl | ................. | 701/428 |
| 7,512,486 B2 * | 3/2009 | Needham et al. | ................. | 701/414 |
| 8,321,125 B2 * | 11/2012 | Tengler et al. | ................. | 701/410 |
| 8,374,781 B2 * | 2/2013 | Hartman | ................. | 701/439 |
| 2007/0005237 A1 * | 1/2007 | Needham et al. | ................. | 701/202 |
| 2008/0221787 A1 * | 9/2008 | Vavrus | ................. | 701/201 |
| 2010/0010732 A1 * | 1/2010 | Hartman | ................. | 701/200 |
| 2010/0049397 A1 * | 2/2010 | Liu et al. | ................. | 701/33 |
| 2010/0088012 A1 * | 4/2010 | O'Sullivan et al. | ................. | 701/200 |
| 2010/0332113 A1 * | 12/2010 | Tengler et al. | ................. | 701/123 |
| 2011/0060495 A1 * | 3/2011 | Kono et al. | ................. | 701/33 |
| 2011/0112760 A1 * | 5/2011 | Serbanescu et al. | ................. | 701/204 |
| 2011/0238457 A1 * | 9/2011 | Mason et al. | ................. | 705/7.14 |

FOREIGN PATENT DOCUMENTS

EP   2136182 A1   12/2009   ............ G01C 21/34

* cited by examiner

*Primary Examiner* — Thomas Black
*Assistant Examiner* — Peter D Nolan
(74) *Attorney, Agent, or Firm* — Lempia Summerfield Katz LLC

(57) ABSTRACT

A method and system for determining energy efficient routes is described. Map data represents road segments. Energy consumption data is obtained while a vehicle travels on a first road segment. Energy consumption data associated with the first road segment can be used to predict the expected energy consumption when traveling on a second road segment that has similar physical attributes to those of the first road segment. The predicted energy consumption data may be used to determine whether the second road segment is part of a most energy efficient route.

19 Claims, 7 Drawing Sheets

| Map Data (314) | | | | | | | |
|---|---|---|---|---|---|---|---|
| Road Seg. | Entrance Node Lat. and Long. (L&L) | Exit Node Lat. and Long. (L&L) | Dist. (km) | Alt. (m) | Speed Limit (km/h) | Ave. no. of stops | Slope (%) | Assoc. Road Seg. |
| 10 | L&L A | L&L B | 6 | 176 | 55 | 0 | 1 | None |
| 11 | L&L B | L&L C | 4 | 185 | 55 | 2 | 10 | None |
| 12 | L&L C | L&L D | 7 | 191 | 70 | 2 | 5 | None |
| 13 | L&L D | L&L E | 6 | 194 | 70 | 3 | 3 | None |
| 14 | L&L E | L&L F | 3 | 190 | 70 | 1 | -5 | None |
| 15 | L&L F | L&L G | 3 | 184 | 30 | 2 | -6 | None |
| 16 | L&L G | L&L H | 8 | 176 | 40 | 1 | -12 | None |
| 17 | L&L B | L&L I | 5 | 176 | 55 | 1 | 0 | None |
| 18 | L&L I | L&L J | 14 | 176 | 55 | 1 | 0 | None |
| 19 | L&L J | L&L K | 1 | 176 | 55 | 1 | 0 | None |
| 20 | L&L K | L&L L | 14 | 176 | 55 | 1 | 0 | None |
| 21 | L&L L | L&L G | 2 | 176 | 55 | 1 | 0 | None |
| 80 | L&L M | L&L N | 6 | 142 | 55 | 0 | 1 | 10 |
| 81 | L&L N | L&L O | 5 | 143 | 55 | 2 | 1 | 17 |
| 82 | L&L O | L&L P | 9 | 145 | 55 | 1 | 1 | 16 |
| 83 | L&L P | L&L Q | 1 | 145 | 55 | 2 | 0 | 19 |
| 84 | L&L Q | L&L R | 11 | 145 | 55 | 1 | 0 | 18 |
| 85 | L&L N | L&L S | 2 | 142 | 30 | 2 | -4 | 15 |
| 86 | L&L S | L&L T | 3 | 143 | 30 | 2 | 5 | 21 |
| 87 | L&L T | L&L U | 2 | 143 | 30 | 2 | 1 | 15 |
| 88 | L&L U | L&L V | 2 | 144 | 30 | 1 | 0 | 21 |
| 89 | L&L V | L&L W | 3 | 146 | 30 | 2 | 5 | 15 |
| 90 | L&L W | L&L X | 3 | 148 | 30 | 1 | 8 | 15 |
| 91 | L&L X | L&L Y | 3 | 146 | 30 | 2 | -4 | 15 |
| 92 | L&L Y | L&L Z | 8 | 146 | 30 | 4 | 0 | 16 |
| 93 | L&L Z | L&L R | 4 | 145 | 30 | 2 | 0 | 11 |

| Road Seg. | Entrance Node Lat. and Long. (L&L) | Exit Node Lat. and Long. (L&L) | Dist. (km) | Alt. (m) | Speed Limit (km/h) | Ave. no. of stops | Slope (%) | Assoc. Road Seg. |
|---|---|---|---|---|---|---|---|---|
| | | | Map Data (314) | | | | | |
| 10 | L&L A | L&L B | 6 | 176 | 55 | 0 | 1 | None |
| 11 | L&L B | L&L C | 4 | 185 | 55 | 2 | 10 | None |
| 12 | L&L C | L&L D | 7 | 191 | 70 | 2 | 5 | None |
| 13 | L&L D | L&L E | 6 | 194 | 70 | 3 | 3 | None |
| 14 | L&L E | L&L F | 3 | 190 | 70 | 1 | -5 | None |
| 15 | L&L F | L&L G | 3 | 184 | 30 | 2 | -6 | None |
| 16 | L&L G | L&L H | 8 | 176 | 40 | 1 | -12 | None |
| 17 | L&L B | L&L I | 5 | 176 | 55 | 1 | 0 | None |
| 18 | L&L I | L&L J | 14 | 176 | 55 | 1 | 0 | None |
| 19 | L&L J | L&L K | 1 | 176 | 55 | 1 | 0 | None |
| 20 | L&L K | L&L L | 14 | 176 | 55 | 1 | 0 | None |
| 21 | L&L L | L&L G | 2 | 176 | 55 | 1 | 0 | None |
| 80 | L&L M | L&L N | 6 | 142 | 55 | 0 | 1 | 10 |
| 81 | L&L N | L&L O | 5 | 143 | 55 | 2 | 1 | 17 |
| 82 | L&L O | L&L P | 9 | 145 | 55 | 1 | 1 | 16 |
| 83 | L&L P | L&L Q | 1 | 145 | 55 | 2 | 0 | 19 |
| 84 | L&L Q | L&L R | 11 | 145 | 55 | 1 | 0 | 18 |
| 85 | L&L N | L&L S | 2 | 142 | 30 | 2 | -4 | 15 |
| 86 | L&L S | L&L T | 3 | 143 | 30 | 2 | 5 | 21 |
| 87 | L&L T | L&L U | 2 | 143 | 30 | 2 | 1 | 15 |
| 88 | L&L U | L&L V | 2 | 144 | 30 | 1 | 0 | 21 |
| 89 | L&L V | L&L W | 3 | 146 | 30 | 2 | 5 | 15 |
| 90 | L&L W | L&L X | 3 | 148 | 30 | 1 | 8 | 15 |
| 91 | L&L X | L&L Y | 3 | 146 | 30 | 2 | -4 | 15 |
| 92 | L&L Y | L&L Z | 8 | 146 | 30 | 4 | 0 | 16 |
| 93 | L&L Z | L&L R | 4 | 145 | 30 | 2 | 0 | 11 |

FIG. 4

| Road Seg. | ECD Fuel Usage (Liters) | Ave. ECD Fuel Usage (Liters) | ECD Elect. Usage (mega joules) | Ave. ECD Elect. Usage (mega joules) |
|---|---|---|---|---|
| 10 | 0.1, 0.1, 0.2, 0.2 | 0.15 | 2.5, 2.4 | 2.45 |
| 11 | 0.08, 0.08 | 0.08 | 2.4, 2.3 | 2.35 |
| 12 | 0.09 | 0.09 | 2.6, 2.6 | 2.6 |
| 13 | 0.07, 0.1, 0.2 | 0.123 | 2.5, 2.6 | 2.55 |
| 14 | 0.07, 0.1, 0.2 | 0.123 | 2.3, 2.3 | 2.3 |
| 15 | 0.08, 0.08, 0.07 | 0.077 | 2.3, 2.3 | 2.3 |
| 16 | 0.15, 0.15, 0.25 | 0.183 | 3.4, 3.1 | 3.25 |
| 17 | 0.08, 0.08 | 0.08 | None | None |
| 18 | 0.2, 0.4, 0.5, 0.4, 0.3, 0.3, 0.7. 0.6 | 0.425 | None | None |
| 19 | 0.02, 0.03 | 0.025 | None | None |
| 20 | 0.2, 0.5, 0.4, 0.7 | 0.45 | None | None |
| 21 | 0.05, 0.06 | 0.055 | None | None |
| 80 | None | None | 2.4, 2.4, 2.2 | 2.33 |
| 81 | None | None | 2.1, 1.9, 1.9 | 1.97 |
| 82 | None | None | 3.5, 3.1, 3.5 | 3.37 |
| 83 | None | None | 0.4, 0.4, 0.5 | 0.43 |
| 84 | None | None | 3.8, 4.0, 3.9 | 3.9 |
| 85 | None | None | None | None |
| 86 | None | None | None | None |
| 87 | None | None | None | None |
| 88 | None | None | None | None |
| 89 | None | None | None | None |
| 90 | None | None | None | None |
| 91 | None | None | None | None |
| 92 | None | None | None | None |

FIG. 5

| Road Segment 18 | | | |
|---|---|---|---|
| ECD (Liters) | Vehicle Identifier | Vehicle Model | Driver | Driving style (Fast/Slow) |
| 0.2 | XYZ123 | Acme XL5 | Male 1 | Slow |
| 0.4 | XYZ123 | Acme XL5 | Female 1 | Fast |
| 0.5 | XWV712 | Acme XL5 | Male 2 | Fast |
| 0.4 | XWV712 | Acme XL5 | Female 2 | Fast |
| 0.3 | XXT101 | Acme GT | Female 3 | Slow |
| 0.3 | XXT348 | Acme GT | Male 3 | Fast |
| 0.7 | XXT917 | Acme GT | Male 1 | Slow |
| 0.6 | XXT998 | Acme GT | Female 1 | Fast |

FIG. 6

ENERGY CONSUMPTION PROFILING

FIELD

The present invention relates generally to green routing and driving, and more particularly, relates to predicting energy consumption based on a learned association rather than from a calculated energy consumption equation.

BACKGROUND

Navigation systems are available that provide end users with various navigation-related functions and features. For example, some navigation systems are able to determine an optimum route to travel along a road network from an origin location to a destination location in a geographic region. Using input from the end user, and optionally from equipment that can determine the end user's location (such as a GPS system), the navigation system can examine various potential routes between the origin and destination locations to determine the optimum route.

The navigation system may then provide the end user with information about the optimum route in the form of guidance that identifies the driving maneuvers required to be taken by the end user to travel from the origin to the destination location. The guidance may take the form of visual and/or audio instructions that are provided along the way as the end user is traveling the route. Some navigation systems are able to show detailed maps on displays outlining the route, the types of maneuvers to be taken at various locations along the route, locations of certain types of features, and so on.

In order to provide these and other navigation-related functions and features, navigation systems use geographic data. The geographic data may be in the form of one or more geographic databases that include data representing physical features in the geographic region. Roads in the geographic region may be represented in the geographic database with one or more road segments. Each road segment is associated with two nodes; one node represents the point at one end of the road segment and the other node represents the point at the other end of the road segment. Alternatively, roads may be represented with curves, such as spline, Bezier, and clothoid curves.

The geographic database also includes information about the represented roads, such as one-way streets, position of the roads, speed limits along portions of roads, address ranges along the road portions, turn restrictions at intersections of roads, direction restrictions, such as one-way streets, and so on. Additionally, the geographic data may include points of interests, such as businesses, facilities, restaurants, hotels, airports, gas stations, stadiums, police stations, and so on.

Although navigation systems provide many important features, there continues to be room for new features and improvements. For example, some navigation systems calculate routes to minimize the vehicle's fuel or energy consumption. Such a route is sometimes referred to as a "green route." There are many factors that determine a vehicle's fuel or energy consumption as the vehicle travels along a particular route. These factors include speed of travel, traffic light and sign locations, weather, and road characteristics, such as surface type, slope, and curvature.

To calculate an energy efficient route, the navigation system uses a route calculation algorithm, such as the Dijkstra or the A* search algorithms. Prior to calculating a route, a cost is assigned to the road segments or curves stored in the geographic database. For energy efficient routing, the cost is based on the road properties of the represented road and how these road properties impact fuel or energy consumption. The route calculation algorithm evaluates different possible routes from an origin to a destination and identifies the route with the least cost.

However, sometimes costs associated with fuel or energy consumption are not available for all road segments. In these cases, it would be beneficial to predict fuel or energy consumption values for traveling on a road segment.

SUMMARY

A computer-implemented method of determining an energy efficient route for traveling from an origin to a destination is described. The method includes receiving a request for a route from an origin location to a destination location on a road network and calculating a route from the origin location to the destination location using road segment data and energy consumption data. Calculating a route includes determining whether energy consumption data is associated with road segment data for each evaluated road segment. If the road segment data for a first road segment is not associated with the energy consumption data, calculating a route further includes predicting energy consumption for traveling on the first road segment using energy consumption data for a second road segment. Calculating a route then includes determining the route having the lowest calculated energy consumption.

A system for determining an energy efficient route from an origin to a destination is also described. The system includes a data storage device having map data, energy consumption data, and program instructions. The system also includes a processor operable to execute the program instructions to calculate an energy efficient route from an origin to a destination using the map data and the energy consumption data. If a first road segment represented by the map data is not associated with energy consumption data, the processor predicts a first energy consumption value for the first road segment by using a second energy consumption value associated with a second road segment having similar physical characteristics.

These as well as other aspects and advantages will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the invention.

BRIEF DESCRIPTION OF THE DRAWINGS

Example embodiments are described herein with reference to the drawings, in which:

FIG. 4 is a table containing example map data;

FIG. 5 is a table containing example energy consumption data for a plurality of road segments;

FIG. 6 is a table containing example energy consumption data, example vehicle data, and example driver data for a particular road segment.

DETAILED DESCRIPTION

Figure 1:
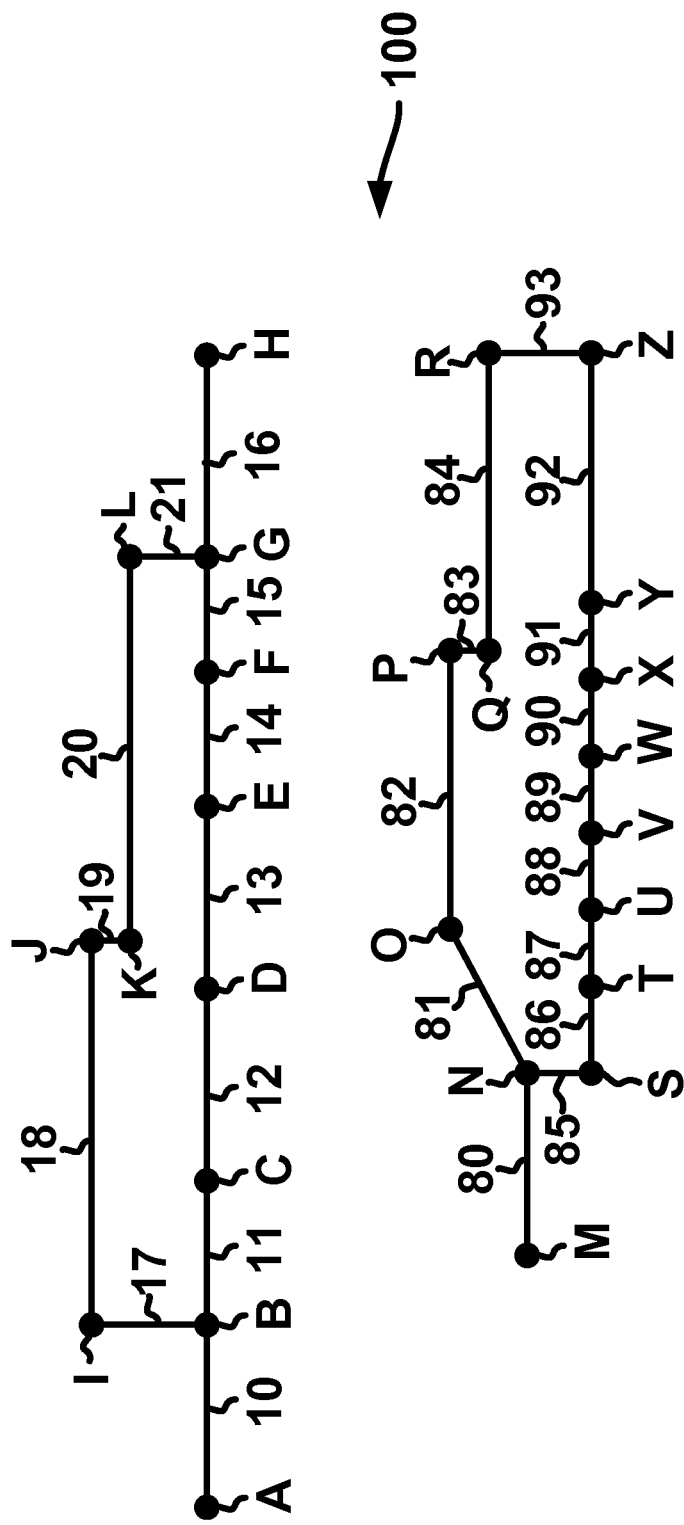
FIG. 1 is a diagram illustrating a plan view of an example road network.

FIG. 1 is a plan view of an example road network 100. The road network 100 includes road segments 10 to 21 and 80 to 93. The road network 100 also includes nodes A to Z. For purposes of this description, the portion of the road network 100 that includes nodes A to L is located in Chicago, Ill. and the portion of the road network 100 that includes nodes M to Z is located in St. Louis, Mo. Those skilled in the art will understand that the road network 100 may include a plurality of other road segments, including road segments that connect the road segments in Chicago to the road segments in St. Louis.

Figure 2:
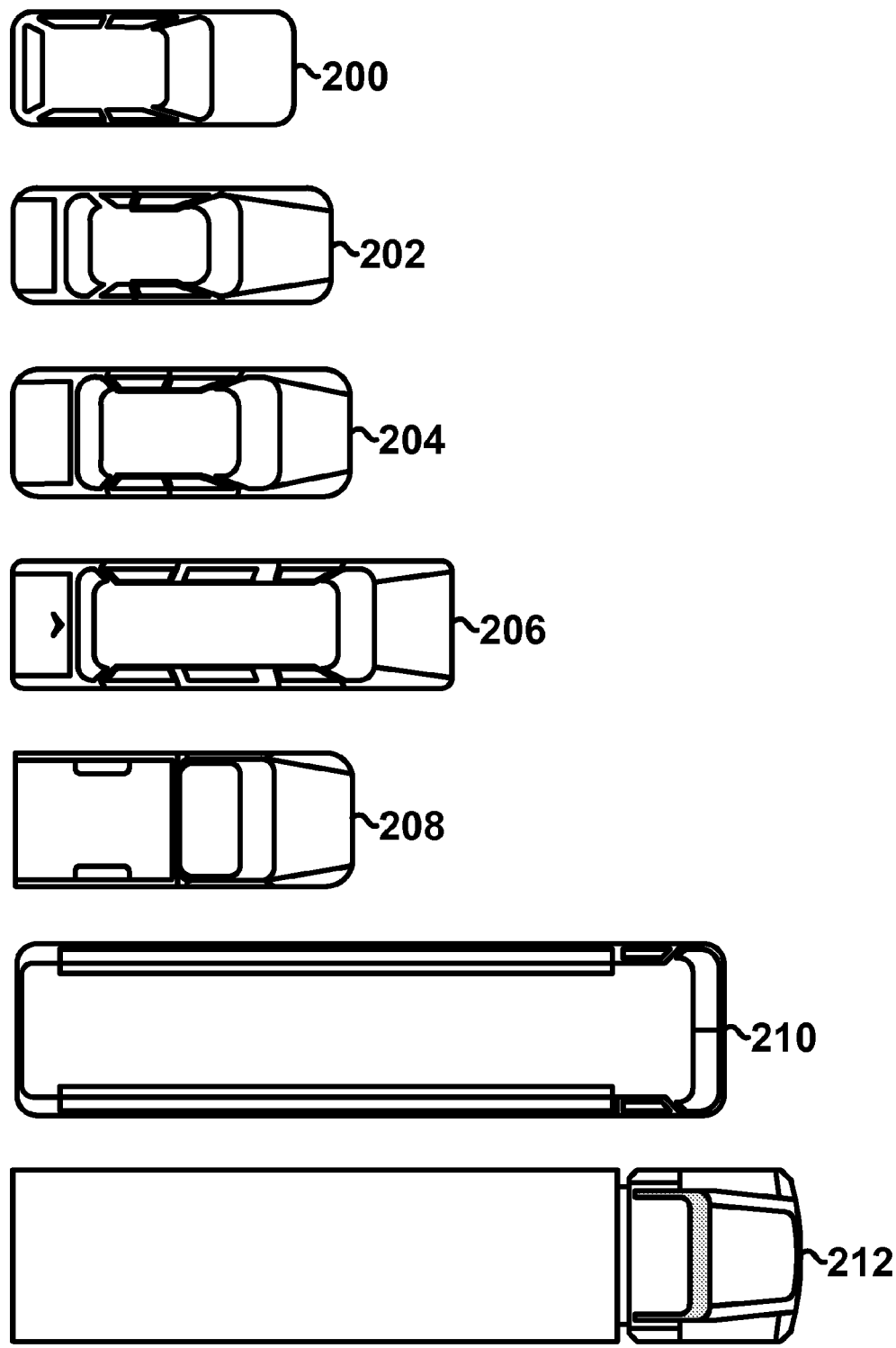
FIG. 2 is a diagram of example vehicles that can be driven on a road network.

FIG. 2 depicts example vehicles 200-212 that can be driven on the road network 100. Vehicle 200 is a compact automobile. Vehicle 202 is a mid-size automobile. Vehicle 204 is a full-size automobile. Vehicle 206 is a limousine. Vehicle 208 is a full-size pickup truck. Vehicle 210 is a tour bus (for example, a coach). Vehicle 212 is a semi-tractor and trailer. Other vehicles that can be driven on the road network 100 are also possible.

For purposes of this description, vehicle 200 is an electric-powered vehicle; vehicle 204 is a hybrid vehicle powered at various times, for example, by an electrical propulsion system or an internal combustion engine; and vehicles 202, 206, 208, 210, and 212 are vehicles powered by internal combustion engines. The vehicles with internal combustion engines include a fuel tank for holding fuel, such as gasoline, compressed natural gas (CNG), diesel fuel, or some other fuel. The capacity of a fuel tank may vary depending on the vehicle. For purposes of this description, the capacity of fuel tanks in vehicles 202, 204, 206, 208, 210, and 212 are 60 liters, 80 liters, 100 liters, 120 liters, 200 liters, and 800 liters, respectively.

Each vehicle shown in FIG. 2 may be a particular model of a plurality of vehicle models made by any of a variety of vehicle manufacturers. As an example, the vehicle manufacturer General Motors, Detroit, Mich., makes multiple mid-size automobile models such as the 2010 model year vehicle models known as the Buick Lacrosse, the Cadillac STS, and the Chevrolet Malibu. Moreover, those vehicle models built by General Motors can further be identified as distinct vehicle models based on features of the vehicle, such as engine displacement, transmission type, or some other feature. Other examples of vehicle manufacturers and vehicle models are also possible.

Figure 3:
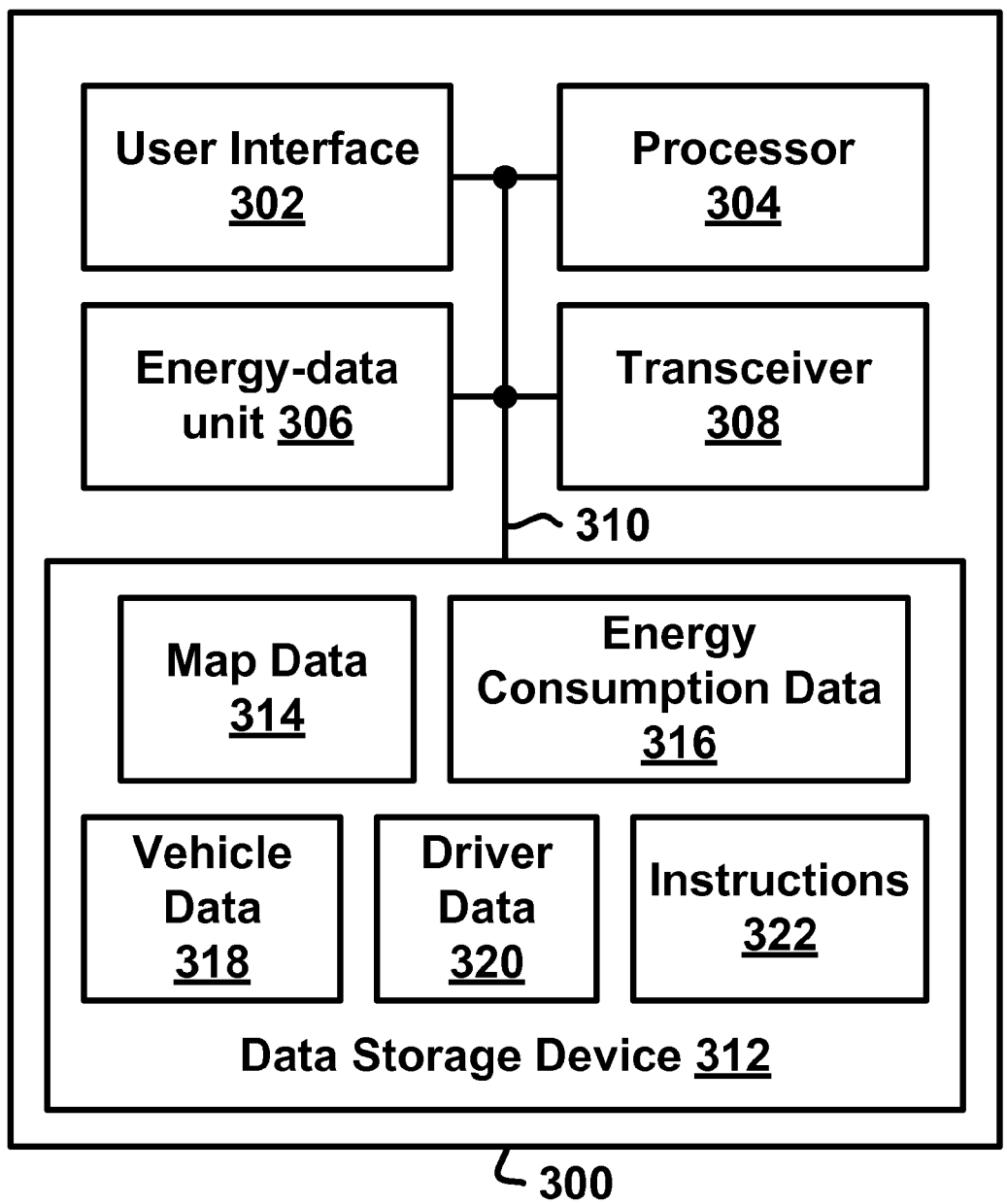
FIG. 3 is a simplified block diagram of an example vehicle system.

FIG. 3 is a simplified block diagram of a vehicle system 300. It should be understood that the block diagram of FIG. 3 and the other diagrams, tables, and flow charts accompanying this description are provided merely as examples and are not intended to be limiting. Many of the elements illustrated in the figures and/or described herein are functional elements that may be implemented as discrete or distributed components or in conjunction with other components, and in any suitable combination and location. Those skilled in the art will appreciate that other arrangements and elements (for example, machines, interfaces, functions, orders, and groupings of functions, etc.) can be used instead. Furthermore, various functions described as being performed by one or more elements may be carried out by a processor executing computer-readable program instructions and/or by any combination of hardware, firmware, and software.

The vehicle system 300 includes a user interface 302, a processor 304, an energy-data unit 306, a transceiver 308, and a data storage device 312, all of which may be linked together via a system bus, network, or other connection mechanism 310.

The user interface 302 includes means for providing data to a user of the vehicle system 300. For example, the user interface 302 may include one or more displays that visually present data to the user. As another example, the user interface 302 may include one or more loud-speakers that audibly present data to the user. Various data may be presented to the user via the user interface 302. The data may include, but is not limited to, a visual representation of a route or portion of the route determined by the vehicle system 300, route guidance instructions (for example, instructions when to turn a vehicle traveling along the determined route), and route estimation data (for example, an estimation of the time it will take to travel a route or an estimation of the energy that will be consumed by a vehicle if a given route is taken).

The user interface 302 also includes means that allow a user to input data into the vehicle system 300. For example, the user interface 302 may include a keypad having one or more keys (e.g., switches) that are operable to input data into the vehicle system 300. As another example, the user interface 302 may include a microphone and associated electronic circuitry that are operable to input data into the vehicle system 300. Various data may be input into the vehicle system 300 via the user interface 302, such as an origin location, a destination location, and a desired route type (for example, a shortest route, a quickest route, and a most energy efficient route).

The processor 304 may include one or more general purpose processors and/or one or more special purpose processors (e.g., digital signal processors). The processor 304 may execute computer-readable program instructions 322 that are contained in the data storage device 312.

The energy-data unit 306 is operable to obtain and/or generate energy data and to provide that energy data to other parts of the vehicle system 300, such as the processor 304, the transceiver 308, and the data storage device 312. The energy-data unit 306 may include a powertrain control module that receives an input signal from a fuel tank sending unit located within a fuel tank of the vehicle. The powertrain control module can convert the input signal into data that represents the fuel level in the fuel tank. For instance, the fuel level ("FL") may be represented as a decimal number within the range of 0 to 65,535. Equation (1) can be used to determine the fuel level as a percentage (%).

$$\text{Fuel level (\%)} = 100 \times FL/65{,}535. \tag{1}$$

The fuel level percentage can be multiplied by the fuel tank volume (for example, fuel tank capacity) to determine an amount of fuel in the fuel tank. The determination of the fuel level percentage or the determination of the fuel level percentage and the fuel amount may be carried out by the energy-data unit 306 and/or the processor 304. The data storage device 312 may contain data representing fuel tank capacity of the vehicle containing the vehicle system 300.

As another example, and in accordance with an embodiment in which the vehicle system 300 is located within an electric-powered vehicle, the energy-data unit 306 may include a propulsion control module that receives an input signal that represents an amount of energy consumed by an electric motor in the vehicle. Alternatively, the input signal may represent a net amount of energy equaling a sum of an amount of energy being consumed by the electric motor plus an amount of energy generated by an electric generator in the vehicle (for example, an amount of recovered energy due to regenerative braking). The propulsion control module (that is, the energy-data unit 306) can convert the input signal into data representing an amount of energy consumed by the vehicle and then provide that data to the processor 304. The amount of energy may, for example, have the units of kilo-watts per hour (kWh). The processor 304 may convert the amount of energy in kWh to mega joules, another unit of energy, via the use of equation (2).

Energy (mega joules)=Energy (in kWh)×Time (in seconds)/1,000     (2)

Equation (2) may be used for multiple portions of a road segment to determine an amount of energy consumed by a vehicle traveling on the road segment. By way of example, it may take 216 seconds for the vehicle to travel from node A to node B of road segment 10. When the vehicle is at node A or substantially close to node A, the energy-data unit 306 may provide the processor 304 with energy data indicating 11.2 kWh, then 72 seconds later, the energy-data unit 306 may provide the processor 404 with energy data indicating 11.4 kWh, and then 72 seconds later, the energy-data unit 306 may provide the processor 404 with energy data indicating 11.0 kWh, and then 72 seconds later, the vehicle passes and/or arrives at node B.

While traveling over the first portion of road segment 10 (that is, during the first 72 second time period), the energy consumed by the vehicle equals 11.2 (kWh)×72 (seconds)/1000=0.81 mega joules. While traveling over the second portion of road segment 10 (that is, during the second 72 second time period), the energy consumed by the vehicle equals 11.4 (kWh)×72 (seconds)/1000=0.82 mega joules. While traveling over the third and final portion of road segment 10 (that is, during the third 72 second time period), the energy consumed by the vehicle equals 10.7 (kWh)×72 (seconds)/1000=0.77 mega joules. The total energy consumed while the vehicle traveled over road segment 10 can be determined as the sum of the individual energy consumption values (for example, 0.81+0.82+0.77=2.4 mega joules). The value of 2.4 mega joules can be stored in the energy consumption data 316 for road segment 10.

The transceiver 308 is operable to transmit data to a device remote from the vehicle system 300 and to receive data from a device remote from the vehicle system 300. For example the data may be energy consumption data or data for generating the energy consumption data. The remote device may be in another vehicle or in a facility. For example, the remote device may be a central server located in a building that collects data from and transmits data to a plurality of vehicles.

In order to carry out the transmitting and receiving functions, the transceiver 308 includes a transceiver interface that interfaces to other elements of the vehicle system 300, such as the connection mechanism 312, an antenna, a transmitter connected to the transceiver interface and the antenna, and a receiver connected to the transceiver interface and the antenna. The processor 304 may execute computer-readable program instructions that cause the transceiver 308 to transmit data to a device remote from the vehicle system 300 and to process data received at the transceiver 308 from a device remote from the vehicle system 300.

Communications between the vehicle system 300 and the remote device may be conducted via a radio frequency (RF) air interface over any of a variety of communication networks or combination of communication networks. Those communication networks may include, but are not limited to, a circuit-switched network (such as a public switched telephone network (PSTN)), a packet-switch network, a wireless communication network (for example, a cellular telephone network), and the Internet. The air interface may carry communications in accordance with any of a variety of wireless protocols, such as the Interim Standard 95 (IS-95) for code division multiple access (CDMA) RF communications, an IEEE 802.11 standard for wireless local area networks, an IEEE 802.16 standard for broadband wireless access (e.g., a WiMAX standard), or some other air interface standard now known or later developed (e.g., a Car-2-Car Communication Standard being developed by the Car 2 Car Communication Consortium, Braunschweig, Germany. With regard to the IEEE 802.11 standard, as an example, the standard may include the IEEE 802.11p standard for Wireless Access for the Vehicular Environments (WAVE).

The connection mechanism 310 may include one or more wired connection mechanisms and/or one or more wireless connection mechanisms. In accordance with an example embodiment in which the vehicle system 300 in located within a vehicle, a wired connection mechanism may include at least a portion of a communication bus within that vehicle, such as a Controller Area Network (CAN) bus, a Media Oriented Systems Transport (MOST) bus, a Society of Automotive Engineers (SAE) J1850 bus, or some other communication bus in accordance with a communication bus standard now known or later developed. In accordance with that same example embodiment, a wireless connection mechanism may include an air interface for carrying out communications in accordance with the IEEE 802.15 and IEEE 802.15.1 standards for Wireless Personal Area Networks (for example, the Bluetooth standard), or some other wireless communication standard now known or later developed.

The data storage device 312 may include a computer-readable storage medium readable by the processor 304. The computer-readable storage medium may include volatile and/or non-volatile storage components, such as optical, magnetic, organic or other memory or disc storage, which can be integrated in whole or in part with the processor 304. The data storage device 312 contains a variety of computer-readable data including, but not limited to, map data 314, energy consumption data 316, vehicle data 318, driver data 320, and computer-readable program instructions 322.

The map data 314 includes computer-readable data that represent road segments of a road network, such as the road network 100. The data represents information about the road segments, such as position (e.g., latitude, longitude, and altitude), construction material, curvature, slope, speed, restrictions, addresses, and so on. Additionally, the data represents information about points of interests along the road segment, such as businesses, facilities, restaurants, hotels, airports, gas stations, stadiums, police stations, and so on.

FIG. 4 is a table containing example map data 314 for the road segments of the road network 100. The left-most column of the table in FIG. 4 lists road segment identifiers for the road segments. The data in each row of the remaining columns is associated with the road segment identified by the road segment identifier of that row. As illustrated in FIG. 4, the map data 314 includes the following data types: (i) entrance node latitude and longitude of a road segment, (ii) exit node latitude and longitude of the road segment, (iii) a distance of the road segment, (iv) an altitude of the road segment, (v) a speed limit on the road segment, (vi) an average number of stops on the road segment, (vii) a slope of the road segment, and (viii) associated road segment. Those skilled in the art will understand that the map data 314 need not include each of those data types and/or the map data 314 may include data types other than those shown in FIG. 4.

A road segment may be associated with another road segment based on having similar physical characteristics (e.g., altitude, distance, speed, number of stops, slope) at a given time of day. In this case, a road segment for which energy consumption data has not yet been determined (or has been determined but not yet stored in data storage device 312) may be associated with a road segment for which energy consumption data has been determined and stored in data storage device 312. In other cases, a given road segment may not be associated with another road segment because the given road segment has physical properties that are not substantially similar to physical properties of another road segment.

In the table depicted in FIG. 4, if the data in the associated road segment column is identified as "None," then a different road segment is not associated with the road segment identified in the left-most column of that row. On the other hand, if the data in the associated road segment column is identified by a number, then a different road segment (identified by that number) is associated with the road segment identified in the left-most column of that row. Those skilled in the art will understand that other identifiers could be used to identify whether a road segment is identified with a different road segment.

The energy consumption data 316 includes computer-readable data representing an amount of energy consumed while traveling over some portion of the road network 100. The energy consumption data 316 may be used to estimate how much energy a vehicle may consume if that vehicle were to travel on the road segments at some time in the future. For a given road segment of the road network 100, the energy consumption data 316 may include energy consumption data obtained while a vehicle traveled on the given road segment at a certain time of day.

If the energy consumption data has not been obtained for a given road segment, the energy consumption data 316 may include data that associates the given road segment with energy consumption data that has been obtained for one or more other road segments defined by physical attributes that are identical, substantially similar to, or the best-match (for example, the closest matching) to physical attributes that define the given road segment. Additionally, the energy consumption data 316 may include duplicate energy consumption data for a given road segment for which energy consumption data has not been obtained. The duplicate energy consumption data may be identical to the energy consumption data obtained for a road segment having physical attributes identical, substantially similar to, or the best-match to those physical attributes of the given road segment. Alternatively, the duplicate energy consumption data may be an average of energy consumption data obtained for road segments having attributes identical, substantially similar to, or the best-match to those attributes that define the given road segment.

Some or all of the energy consumption data 316 may be generated by the energy-data unit 306. Additionally or alternatively, some or all of the energy consumption data 316 may be generated by the processor 304 based on data received from the energy-data unit 306.

FIG. 5 depicts a table containing example energy consumption data 316. The first column includes road segment identifiers within the road network 100. The data in each row of the remaining columns is associated with the road segment identified by the road segment identifier of that row. The other columns in the table of FIG. 5 include data indicating a number of liters of fuel a vehicle consumed when traveling on the road segment of that row, an average number of liters of fuel a vehicle consumed when traveling on the road segment of that row, a number of mega joules of electricity a vehicle consumed when traveling on the road segment of that row, and an average number of mega joules of electricity a vehicle consumed when traveling on the road segment of that row. The use of "None" in a given row of the table of FIG. 5 represents that a particular type of energy consumption data has not been determined for the road segment represented by the given row.

The vehicle data 318 includes computer-readable data that identifies one or more specific vehicles and/or one or more vehicle models. The vehicle data 318 may be associated with the map data 314, the energy consumption data 316, and/or the driver data 320.

The driver data 320 includes computer-readable data that identifies a particular driver and/or a particular driving style. The driver data 320 may be associated with the map data 314, the energy consumption data 316, and/or the vehicle data 318.

The driving style identified by the driver data 320 may include any of a variety of driving styles (for example, driving tendencies). For example, the driver style may be classified with respect to aggressiveness and/or speed. Of course other driving styles may be used.

Recording the acceleration rates may provide an indication of an aggressive factor. A fast acceleration variation may indicate an aggressive driving style, while a slow acceleration variation may indicate a more defensive driving style.

Recording speed relative to speed limits may provide an indication of a speed factor. A driver's compliance with the speed limits during previous drives may indicate future behavior. For example, if the driver drives ten miles over the speed limit on a highway, it is likely that the driver will drive ten miles over the speed limit on future drives on a highway, which results in a better estimation of the speed contribution to fuel usage for future roads. Driving styles classified with respect to speed may include fast, average, and slow driving styles.

As another example, the speed factor may be determined by comparing a time it takes a vehicle to travel over one or more road segments to an estimated time it should take a vehicle to travel over those one or more road segments if the vehicle is driven at a speed limit associated with those one or more road segments. If the vehicle is driven across the one or more road segments in a time less than the estimated time or less than the estimated time minus a threshold amount of time, then the driving style of that driver may be classified as fast. If the vehicle is driven across the one or more road segments in a time greater than the estimated time or greater than the estimated time plus a threshold amount of time, then the driving style of that driver may be classified as slow. If the vehicle is driven across the one or more road segments in a time equal to the estimated time or a time that is greater than the estimated time minus the threshold amount of time and less than the estimated time plus the threshold amount of time, then the driving style of that driver may be classified as average.

The computer-readable program instructions 322 may include a variety of computer-readable program instructions (or more simply, "program instructions"). Examples of those program instructions are provided below. Other functions described in this description, but not expressly described in an example of the instructions 322, may also be carried out by execution of instructions 322.

The instructions 322 may include data collection program instructions that are executable by the processor 304 to determine an amount of energy used to travel along a road segment and to cause the data storage device 312 to store the determined amount of energy as the energy consumption data 316 associated with that road segment. For a vehicle having a fuel tank and an internal combustion engine, those program instructions may solve an equation such as equation (3) to determine the amount of energy consumed as an amount of fuel used between the first node of a road segment and a second node of the road segment. In equation (3), $FL_{Start}$ equals the fuel tank level at the first node of the road segment and $FL_{End}$ equals the fuel tank level at the second node of the road segment.

$$\text{Energy consumed} = 100 \times (FL_{Start} - FL_{End}) \times (\text{Fuel Tank Capacity})/65{,}535 \qquad (3)$$

By way of example, as the vehicle 202 travels on the road network 100, the energy-data unit 306 may provide the processor 304 with fuel level input data of 40,001 as the vehicle passes node D and fuel level input data of 40,000 as the vehicle subsequently passes node E. Using equation (3), the Energy consumed=100×(40,001−40,000)×(60 liters)/65,535=0.09155 liters. That value of energy consumed may be stored as the energy consumption data 316 that is associated with the road segment 13.

The instructions 322 may also include data analysis program instructions that are executable by the processor 304 to combine the data associated with a road segment. Execution of those program instructions may cause the processor 304 to determine average energy consumption data that is associated with a specific vehicle, a vehicle model, a particular driver, a driving style, or some combination of those data categories.

FIG. 6 depicts a table containing example energy consumption data, example vehicle data, and example driver data. The example vehicle data includes the data in the "Vehicle Identifier" column and the data in the "Vehicle Model" column. The example driver data includes the data in the "Driver" column and the data in the "Driving Style" column. All of the data in the table of FIG. 6 is associated with road segment 18. The data storage device 312 may include data (for example, data pointers) for associating the data in the table of FIG. 6. The energy consumption data (ECD) in each row of FIG. 6 may include a single instance of data received for a vehicle or an average of multiple instances of data received for the vehicle.

Using the data in the table of FIG. 6, the processor 304 can determine average energy consumption data for vehicles that are the model Acme XL5 and that may travel on road segment 18. The average energy consumption data for vehicle model Acme XL5 traveling on road segment 18 equals (0.2+0.4+0.5+0.4)/4=0.375 liters. The vehicle system 300 can use that average energy consumption data for determining whether road segment 18 is part of a most energy efficient route to be taken by a vehicle that is the vehicle model Acme XL5 or some vehicle model associated as being substantially similar to Acme XL5.

As another example, the processor 304 can determine average energy consumption data based on a particular driving style, such as a fast driving style. Based on the data in the table of FIG. 6, the average energy consumption data for the fast driving style, for vehicles traveling on road segment 18, equals (0.4+0.5+0.4+0.3+0.6)/5=0.44 liters. The vehicle system 300 can use that average energy consumption data for determining whether road segment 18 is part of a most energy efficient route to be taken by a vehicle being driven by a driver having a fast driving style.

Furthermore, the vehicle system 300 could limit the driving style information used to determine the average energy consumption data, such as the driving styles associated with the vehicle model Acme XL5. Based on the data in the table of FIG. 6, the average energy consumption data for the fast driving style for the Acme XL5 model, for vehicles traveling on road segment 18, equals (0.4+0.5+0.4)/3=0.43 liters. The vehicle system 300 can use that average energy consumption data for determining whether road segment 18 is part of a most energy efficient route to be taken by a vehicle that is the Acme XL5 model and that is being driven by a driver having a fast driving style.

The instructions 322 may also include route calculation program instructions executable by the processor 304 to use the map data 314 and the energy consumption data 316 to determine an optimum route. A route may be considered the "optimum" route based on different route qualities, such as shortest, fastest, and most energy efficient. To determine the optimum route, the route calculation program minimizes route cost. The route cost may be based on distance, time, energy consumption, and so on. The route cost also may be based on a combination of these quantities. The cost is typically calculated for each road segment along the route and the cost of a route is the sum of the costs for all its road segments.

For example, the user interface 302 may receive a request for the most energy efficient route between an origin at node M and a destination at node R of the road network 100. A seen in FIG. 1, the road network 100 includes two routes between nodes M and R. A first route consists of road segments 80, 81, 82, 83, and 84 and the second route consists of road segments 80, 85, 86, 87, 88, 89, 90, 91, 92, and 93. The processor 304 executing the route calculation program instructions may determine that the first route is the most energy efficient route between nodes M and R using costs based on energy consumption.

Referring to the energy consumption data 316 in FIG. 5, the processor 304 may determine that the energy consumption data 316 does not include any fuel usage data for road segments 80 to 93. The processor 304 may then determine that the map data 314 includes data that associates each of the road segments 80 to 93 with one of the road segments 10, 11, 15, 16, 17, 18, 19, and 21. The processor 304 may then use energy consumption data for the road segments 10, 11, 15, 16, 17, 18, 19, and 21, as needed, during route calculation.

As shown in FIG. 5, the estimated amount of energy (in liters of fuel) that would be consumed by a vehicle traveling on road segments 80, 81, 82, 83, and 84 is 0.15 liters, 0.08 liters, 0.183 liters, 0.025 liters, and 0.425 liters, respectively. The sum of those estimates is 0.863 liters. The estimated amount of energy that would be consumed traveling on road segments 80, 85, 86, 87, 88, 89, 90, 91, 92, and 93 is 0.15 liters, 0.077 liters, 0.055 liters, 0.077 liters, 0.055 liters, 0.077 liters, 0.077 liters, 0.077 liters, 0.183 liters, and 0.08 liters, respectively. The sum of those estimates is 0.908 liters. Based on the sums of estimated fuel consumption, less fuel would be used if a vehicle travels on the first route than if the vehicle travels on the second route.

The instructions 322 may also include route guidance program instructions executable by the processor 304 to cause the user interface 302 to present, to a user, data regarding a most energy efficient route. The presentation may include visually presenting map data 314 associated with road segments of the most energy efficient route. The presentation may also include visually and/or audibly presenting route guidance instructions and/or route estimation data.

Figure 7:
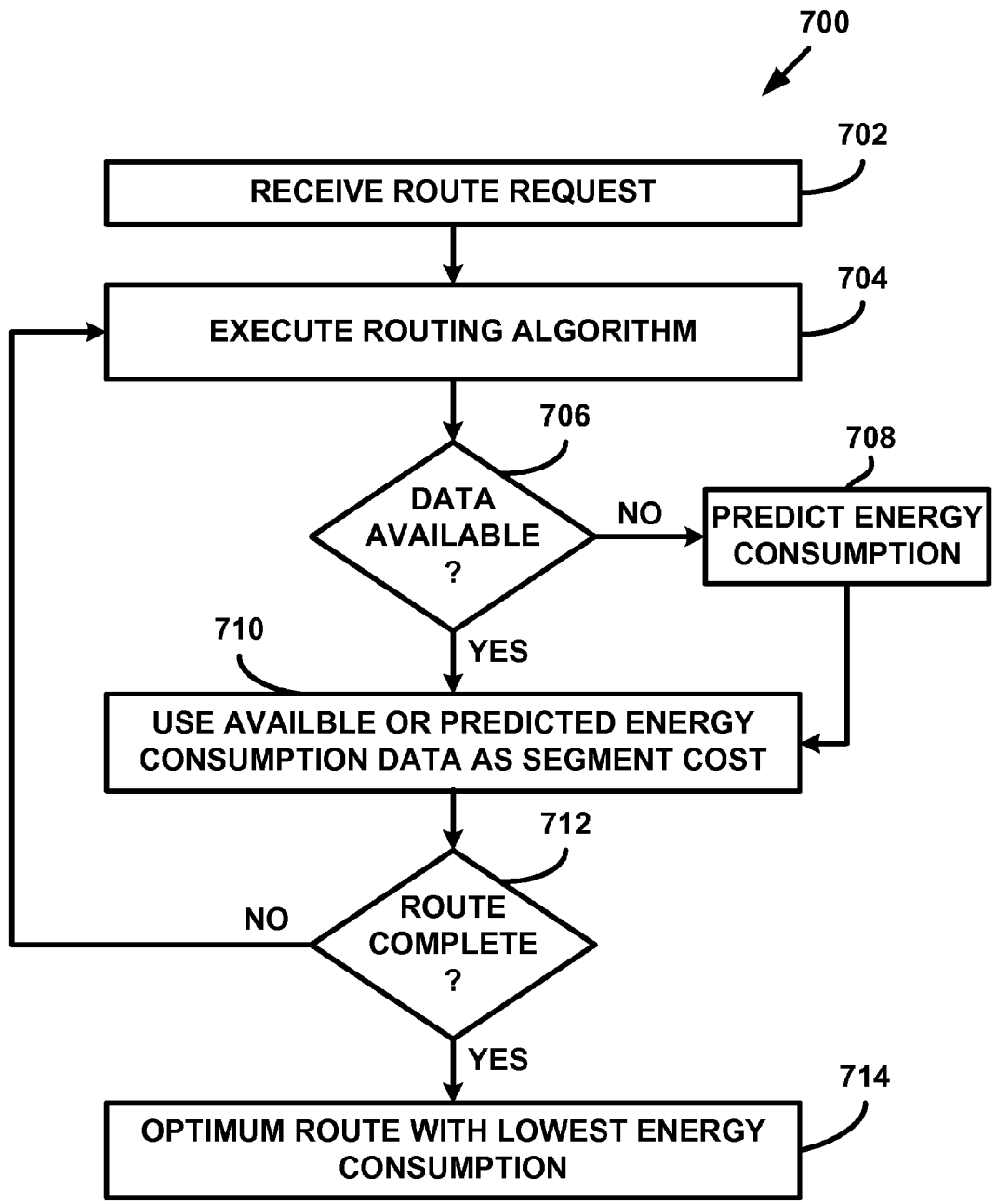
FIG. 7 is a flow chart of a method of calculating a energy efficient route, according to an example.

FIG. 7 is a flow chart of a method 700 for calculating an energy efficient route. For example, the vehicle system 300 may implement the method 700. While the vehicle system 300 is used in the following description, it is understood that other systems may implement the method 700.

At block 702, the vehicle system 300 receives a routing request. The routing request may include an origin, a destination, and an indication of a preference for an energy efficient route. Alternatively, the vehicle system's current location may be used as the origin. In this example, a positioning device, such as a GPS device, is used for determining the current location of the vehicle system 300.

At block 704, the vehicle system 300 executes a route calculation algorithm, such as the A* routing algorithm or Dijkstra's routing algorithm, using segment costs based on energy consumption. At block 706, the vehicle system 300 determines whether energy consumption data is available for the road segments being evaluated. If data is not available for a road segment, at block 708, the vehicle system 300 predicts the amount of energy that will be consumed by a vehicle traveling on the road segment.

The vehicle system 300 may predict the energy consumption by determining that the road segment with missing energy consumption data (first road segment) has similar physical characteristics to another road segment (second road segment) with associated energy consumption data, preferably at the current time of day. The vehicle system 300 may predict that the energy consumption for traveling on the first road segment is the same as traveling on the second road segment. In addition, the prediction may be based on a specific vehicle, a vehicle model, a particular driver, and/or a driving style of a driver.

As an example, the vehicle system 300 may determine that at least a threshold number of the physical attributes of the first road segment and the physical attributes of the segment road segment are substantially the same. The map data 314 in FIG. 4 shows that the distance, speed limit, average number of stops, and slope values for road segments 10 and 80 are identical. If the threshold number of physical attributes equals two, then those four identical physical attributes are sufficient to determine that road segment 80 is substantially similar to road segment 10. Thus, the vehicle system 300 may predict that a fuel-powered vehicle traveling on road segment 80 will use 0.15 liters of fuel.

As another example, the vehicle system 300 may determine that at least one physical attribute of the first road segment (for example, distance) is within a threshold value (for example, 85%) of the same physical attribute of the second road segment. The map data 314 in FIG. 4 shows that the distance for road segment 82 is 9 km and the distance for road segment 16 is 8 km. Since the distance of road segment 16 is at least 85% of the distance of road segment 82, a determination can be made that the distances of road segments 16 and 82 are substantially similar. Thus, the vehicle system 300 may predict that a fuel-powered vehicle traveling on road segment 82 will use 0.183 liters of fuel.

At block 710, the route calculation algorithm uses the available or predicted energy consumption data as the segment cost. At block 712, the vehicle system 300 determines if the route is complete. If not, the method 700 returns to block 704 to continue the process of calculating the most energy efficient route. Otherwise, at block 714, the method 700 stops after determining the most energy efficient route. The vehicle system 300 may provide instructions for traveling on the calculated route and/or display the calculated route on the user interface 302.

Beneficially, the vehicle system collects energy consumption data as the vehicle is driven in a region, so the energy consumption data is more accurate as it is based on the vehicle's actual consumption for a particular driver. This real time energy consumption data collection results in an energy consumption profile for a particular vehicle/driver combination. As a result, a driver who normally drives in one geographic region, such as Chicago, can obtain more accurate information regarding an energy efficient route when driving in a new geographic region, such as St. Louis.

Example embodiments have been described above. Those skilled in the art will understand that changes and modifications may be made to the described embodiments without departing from the true scope and spirit of the present invention, which is defined by the claims. For example, energy consumption prediction may occur prior to receiving a routing request. As another example, energy consumption prediction may be performed by a remote device and the results transmitted to the vehicle system.

As yet another example, the term "average" used throughout the description is not limited to the mathematical definition of calculating an arithmetic mean. Those skilled in the art will recognize that while arithmetic means may be used as a quick calculation, more "representative" values may be obtained using clusterization or other techniques. Thus, the term "average" should also be understood to encompass the more general definition of typical or representative.

We claim:

1. A computer-implemented method of determining an energy efficient route for traveling from an origin to a destination, comprising:
    receiving a request for a route from an origin location to a destination location on a road network;
    calculating a route from the origin location to the destination location using road segment data and energy consumption data, wherein calculating a route includes:
        determining whether energy consumption data is associated with road segment data for each evaluated road segment;
        determining whether the road segment data for a first road segment lacks energy consumption data;
        predicting in response to the lack of energy consumption data, energy consumption for traveling on the first road segment using energy consumption data for a second road segment; and
        determining the route having the lowest calculated energy consumption,
    wherein the second road segment has road segment data that contains a threshold number of values representing physical attributes of the second road segment that are substantially similar to the road segment data values associated with the first road segment data.

2. The method of claim 1, wherein the physical attributes include at least one of distance, altitude, speed, average number of stops, and slope.

3. The method of claim 1, wherein predicting energy consumption is based on a specific vehicle.

4. The method of claim 1, wherein predicting energy consumption is based on a vehicle model.

5. The method of claim 1, wherein predicting energy consumption is based on a particular driver or a driving style of a driver.

6. The method of claim 1, further comprising providing route guidance for traveling on the route having the lowest calculated energy consumption.

7. The method of claim 1, further comprising collecting energy consumption data when a vehicle travels on the route having the lowest calculated energy consumption.

8. A system for determining an energy efficient route from an origin to a destination, comprising:
    a data storage device having a map data table, energy consumption data, and program instructions, wherein the map data table associates a first road segment and a second road segment having similar physical characteristics; and
    a processor operable to execute the program instructions to calculate an energy efficient route from an origin to a destination using the map data and the energy consumption data, wherein the processor determines whether the first road segment represented by the map data lacks energy consumption data, and the processor predicts a first energy consumption value for the first road segment by using a second energy consumption value associated with the second road segment having similar physical characteristics to the first road segment that exceed a threshold number of physical characteristics.

9. The system of claim 8, wherein the data storage device has vehicle data and wherein the processor uses data representing a specific vehicle to calculate the energy efficient route.

10. The system of claim 8, wherein the data storage device has vehicle data and wherein the processor uses data representing a vehicle model to calculate the energy efficient route.

11. The system of claim 8, wherein the data storage device has driver data and wherein the processor uses data representing a particular driver to calculate the energy efficient route.

12. The system of claim 8, wherein the data storage device has driver data and wherein the processor uses data representing a driving style to calculate the energy efficient route.

13. The system of claim 8, wherein the processor executes program instructions to collect energy consumption data while a vehicle travels on the energy efficient route.

14. The system of claim 8, wherein the processor executes program instructions to analyze the map data and determine if the first and second road segments have similar physical characteristics.

15. The system of claim 8, wherein the processor executes program instructions for providing route guidance for traveling on the energy efficient route.

16. The system of claim 8, further comprising an energy-data unit operable to generate the energy consumption data.

17. The system of claim 8, further comprising a transceiver operable to receive the energy consumption data from a remote device.

18. A geographic database system for use in calculating energy efficient routes, comprising:
a representation of a road network in a geographic region, wherein the road network representation includes road segment data defining physical properties of an associated road segment; and
a representation of energy associated with traveling on road segments, wherein, based on a determination of whether the energy consumption representation lacks data for a first road segment, the road network representation includes a pointer to a second road segment, wherein the second road segment has physical properties similar to the first road segment in a quantity that exceeds a threshold number of physical properties, and wherein the energy consumption representation includes data for the second road segment.

19. A computer-implemented method of determining an energy efficient route for traveling from an origin to a destination, comprising:
receiving a request for a route from an origin location to a destination location on a road network;
calculating a route from the origin location to the destination location using road segment data and energy consumption data, wherein calculating a route includes:
determining whether energy consumption data is associated with road segment data for each evaluated road segment;
if the road segment data for a first road segment is not associated with the energy consumption data, predicting energy consumption for traveling on the first road segment using energy consumption data for a second road segment;
accessing a lookup table for the energy consumption data and the road segment data, wherein an entry for the second segment indicates a number for an energy consumption value, and an entry for the first segment indicates none for an energy consumption value; and
determining the route having the lowest calculated energy consumption.

* * * * *